US006282784B1

United States Patent
Genouille

(10) Patent No.: US 6,282,784 B1
(45) Date of Patent: Sep. 4, 2001

(54) METHOD OF ASSEMBLING INTERNAL COMBUSTION ENGINE CONNECTING ROD

(75) Inventor: Michel Genouille, Verrieres le Buisson (FR)

(73) Assignee: Ascometal, Puteaux (FR)

( * ) Notice: Subject to any disclaimer, the term of this patent is extended or adjusted under 35 U.S.C. 154(b) by 0 days.

(21) Appl. No.: 09/562,639

(22) Filed: May 2, 2000

Related U.S. Application Data

(62) Division of application No. 08/906,415, filed on Aug. 5, 1997, now Pat. No. 6,076,426.

(30) Foreign Application Priority Data

Aug. 5, 1996 (FR) .................................................. 96 09859

(51) Int. Cl.⁷ .................................................. B23P 15/00
(52) U.S. Cl. ............................ 29/888.09; 29/558; 74/593
(58) Field of Search ................................ 29/888.09, 557, 29/558, 428; 74/579 E, 593

(56) References Cited

U.S. PATENT DOCUMENTS

| 3,818,557 | * | 6/1974 | Bailey et al. | 29/413 |
| 4,688,446 | * | 8/1987 | Ishikawa | 29/888.09 |
| 5,524,507 | * | 6/1996 | Olmr et al. | 29/888.09 |

FOREIGN PATENT DOCUMENTS

| 1198613 | 8/1965 | (DE) . |
| 47-23243 | 6/1972 | (JP) . |
| WO 86/04122 | 7/1986 | (WO) . |

* cited by examiner

Primary Examiner—I Cuda Rosenbaum
(74) Attorney, Agent, or Firm—Oblon, Spivak, McClelland, Maier & Neustadt, P.C.

(57) ABSTRACT

Forged connecting rod, in particular of an internal combustion engine, including a body (1), a connecting rod small end (2) and a connecting rod big end (3), forming two connecting rod small end and connecting rod big end bearings for receiving respectively a piston pin and a crankpin. The connecting rod is being constituted by two half connecting rods (5) which are substantially symmetrical relative to a longitudinal median plane (6) of the connecting rod, which plane contains the longitudinal axis of the connecting rod, the joint surface (9) of the half connecting rods being essentially disposed in the median plane (6), the half connecting rods (5), each of which has a connecting rod half bearing (7) and a connecting rod big end half bearing (8). Located on each side of the connecting rod small end and big end, are serrations (10) which are formed on the joint surface (9) of the half connecting rods and fit into one another in a complementary manner, these serrations ensuring by their shape a locking against slip of the two half connecting rods (5) in the joint plane, in particular along the longitudinal axis of the connecting rod and along the axis of the crankpin and the piston pin simultaneously.

1 Claim, 4 Drawing Sheets

METHOD OF ASSEMBLING INTERNAL COMBUSTION ENGINE CONNECTING ROD

This application is a division of Ser. No. 08/906,415 Aug. 5, 1997 U.S. Pat. No. 6,076,426.

BACKGROUND OF THE INVENTION

FIELD OF THE INVENTION

The present invention relates to a forged connecting rod, in particular of an internal combustion engine, comprising a body, a connecting rod small end and a connecting rod big end forming two connecting rod small end and connecting rod big end bearings for respectively receiving a piston pin and a crankpin, said connecting rod comprising two half connecting rods which are substantially symmetrical relative to a longitudinal median plane of the connecting rod, said plane containing the longitudinal axis of the connecting rod, the joint surface of the half connecting rods being essentially contained in the median plane, said half connecting rods, each of which carries a connecting rod small end half bearing and a connecting rod big end half bearing, being interconnected by at least one immobilizing means positioned on each side of the connecting rod small end and big end.

A connecting rod is known which comprises a body, a connecting rod small end and a connecting rod big end forming cylindrical bearings for receiving, on one hand, a piston pin and, on the other hand, a crankpin. The connecting rod is constituted by two forged half connecting rods which are assembled together along a joint surface and locked to each other by immobilizing means. The two half connecting rods each comprise two half bearings and are substantially symmetrical relative to the longitudinal median plane of the connecting rod and the joint surface is essentially contained in said longitudinal median plane. At least one immobilizing element is located on the body of the connecting rod between the big end and the small end of the connecting rod.

This design of a forged connecting rod, formed by half connecting rods which are completely identical for reasons of industrialization and production by forging methods, makes it necessary to prevent any micro relative displacement of the half connecting rods which might produce a fretting phenomenon on the contacting surfaces. A complete immobilization can be achieved by means of centering screws, but this method involves difficulties of construction and production costs.

In order to prevent the displacement of one half connecting rod relative to the other, it is possible to envisage providing serrations, for example linear serrations or linear and crossed serrations. Now, linear serrations do not permit an assembly by superimposition of two half connecting rods without risk of an offset position of one half connecting rod relative to the other to the extent of a pitch or two pitches of the serrations.

Further, the linear serrations do not prevent the possibility of the displacement of one half connecting rod relative to the other in the longitudinal direction of the serrations.

SUMMARY OF THE INVENTION

An object of the invention is to provide a forged connecting rod, in particular of an internal combustion engine, which provides, by the superimposition of two half connecting rods which are matched and machined simultaneously, a locking of one half connecting rod relative to the other in the joint plane with no possibility of an offset or a displacement.

The invention provides a forged connecting rod which is characterized in that the immobilizing means further comprise serrations which are provided on the joint surface of the half connecting rods and fit into one another in a complementary manner, said serrations ensuring by their shape a locking against slip of the two half connecting rods in the joint plane, a locking against slip on the longitudinal axis of the connecting rod and along the axis of the crankpin and the piston pin simultaneously.

Other characteristics of the invention are:

the assembling means comprise serrations of curved shape.

the assembling means comprise serrations in the shape of arcs of a circle.

the assembling means comprise serrations in the shape of concentric arcs of a circle, the concavity of which is oriented in a single direction.

the assembling means comprise serrations the concavity of which is oriented along an axis coincident with the longitudinal axis of the connecting rod.

The invention also relates to a method for producing a connecting rod from as-forged rough half connecting rods, in which rough half connecting rods are placed on the periphery of a circular plate for the distribution of different successive machining operations, characterized in that it comprises:

placing and clamping the as-forged rough half connecting rods in pairs in diametrally opposed relation, the joint surface remaining free, carrying out on each of the two half connecting rods a boring spotfacing and machine surfacing operation on the joint surface, the boring and spotfacing operations being intended for the mechanical assembly of said half connecting rods and the fixture of the half connecting rods on the plate, producing on the machine surfaced joint surface of the two half connecting rods serrations which ensure by their shape after the assembly of the two half connecting rods in facing relation to each other, a locking against slip in the joint plane, said locking occurring in particular along the longitudinal axis of the connecting rod and along the axis of the crankpin or the piston pin simultaneously.

machine surfacing parallel faces defining the thickness of the connecting rod big end or small end.

assembling the two half connecting rods by rotation through 180° of one half connecting rod relative to an axis of rotation parallel to the plane of the circular plate, the serrations fitting into one another in a complementary manner.

machining bores forming connecting rod big end and small end bearings.

The invention also relates to a device for producing a connecting rod by means of the aforementioned method from as-forged rough half connecting rods, said device comprising a circular plate for the distribution of different successive machining operations, characterized in that it comprises in diametrally opposed relation the following machining stations having the same function:

a clamp for the as-forged rough half connecting rods, a station for the boring spotfacing and machine surfacing the joint surface, a fixture station, a serrating station for machining the serrations, a station for machine surfacing parallel faces defining the thickness of the connecting rod big end or small end, a rotary assembling station for assembling two half connecting rods for positioning two half connecting rods in facing relation, the serrations fitting into one another in a complementary manner, a station for machining bores which form connecting rod big end and small end bearings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

The following description and the accompanying drawings, given by way of a non-limitative example, will explain the invention.

DESCRIPTION OF THE PREFERRED EMBODIMENTS

Figure 1:
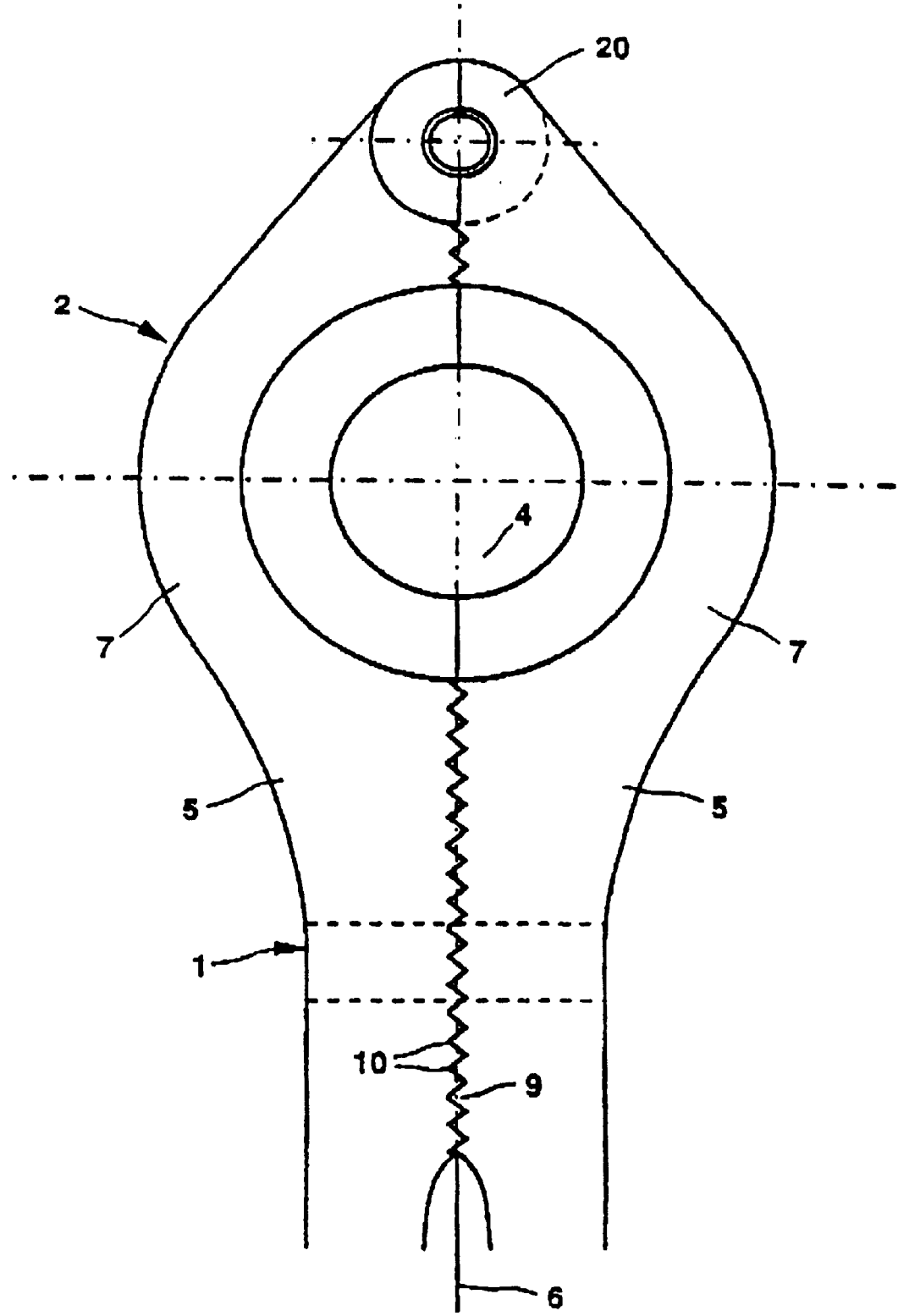
FIG. 1 is a general perspective view of a connecting rod according to the invention.

Referring now to the drawings, wherein like reference numerals designate identical or corresponding parts throughout the several views.

FIG. 1 shows a connecting rod according to the invention, in particular of an internal combustion engine, which comprises a body 1, a connecting rod small end 2 and a connecting rod big end 3 which is not shown in the Figure, the connecting rod small end and big end forming bearings each receiving a cylindrical piston pin 4 or a crankpin which is not shown in the Figure. The connecting rod comprises two half connecting rods 5 which are symmetrical relative to a longitudinal median plane 6 of the connecting rod, the parts 5 comprising at each of their ends a half bearing 7, 8.

The joint surface 9 of the two half connecting rods 5 is essentially contained in the median plane 6 and said half connecting rods 5 are interconnected by immobilizing means provided on the body 1 of the connecting rod between the small end 2 and the big end 3 of the connecting rod. In one embodiment, the immobilizing means comprise two bolts.

The connecting rod may also comprise a locking key 20 at one of its ends.

In the case of an assembly with bolts which do not have a centering function, the assembly clearances do not ensure a complete immobilization between the half connecting rods.

In operation, a connecting rod produces contact forces between the half bearings 7 of the connecting rod and the piston pin 4. These contact forces produce components which cause a displacement between the half connecting rods 5.

Although very small, this displacement may result in a deterioration of the surfaces of the piston pin, the crankpin and the bearings and adversely affect a good operation of the connecting rod.

According to the invention, the immobilizing means further comprise serrations 10 which are provided on the joint surface 9 of the half connecting rods which fit into one another in a complementary manner, these serrations ensuring by their shape a locking against slip of the two half connecting rods 5 in the joint plane, in particular along the longitudinal axis of the connecting rod and along the axis of the crankpin and piston pin simultaneously.

Preferably and in order to reduce costs, the serrations 10 have a curved shape in the form of arcs of a circle.

The immobilizing means comprise serrations 10 in the form of concentric arcs of a circle the concavity of which is oriented in a single direction, as for example along an axis coincident with the longitudinal axis of the connecting rod.

The invention also relates to a method for producing a connecting rod from as-forged rough half connecting rods, in which rough half connecting rods are placed on the periphery of a circular plate 11 for the distribution of different successive machining operations, characterized in that said method comprises:

placing and clamping the as-forged rough half connecting rods in pairs in diametrally opposed relation, the joint surface remaining free, carrying out on each of the two half connecting rods a boring spotfacing and machine surfacing operation on the joint surface 9, the boring and spotfacing being intended for the mechanical assembly of said half connecting rods and the fixture of the half connecting rods on the plate, producing on the machine surfaced joint surface of the two half connecting rods serrations which ensure by their shape, after assembly of the two half connecting rods in facing relation, a locking against slip in the joint plane, said locking being achieved in particular along the longitudinal axis of the connecting rod and along the axis of the crankpin and/or the piston pin simultaneously, effecting a machine surfacing of parallel faces defining the thickness of the big end or small end of the connecting rod, assembling the two half connecting rods by a rotation through 180° of one half connecting rod relative to an axis of rotation parallel to the plane of the circular plate, the serrations fitting into one another in a complementary manner with a single possible position, machining bores forming connecting rod big end and small end bearings.

Figure 2:
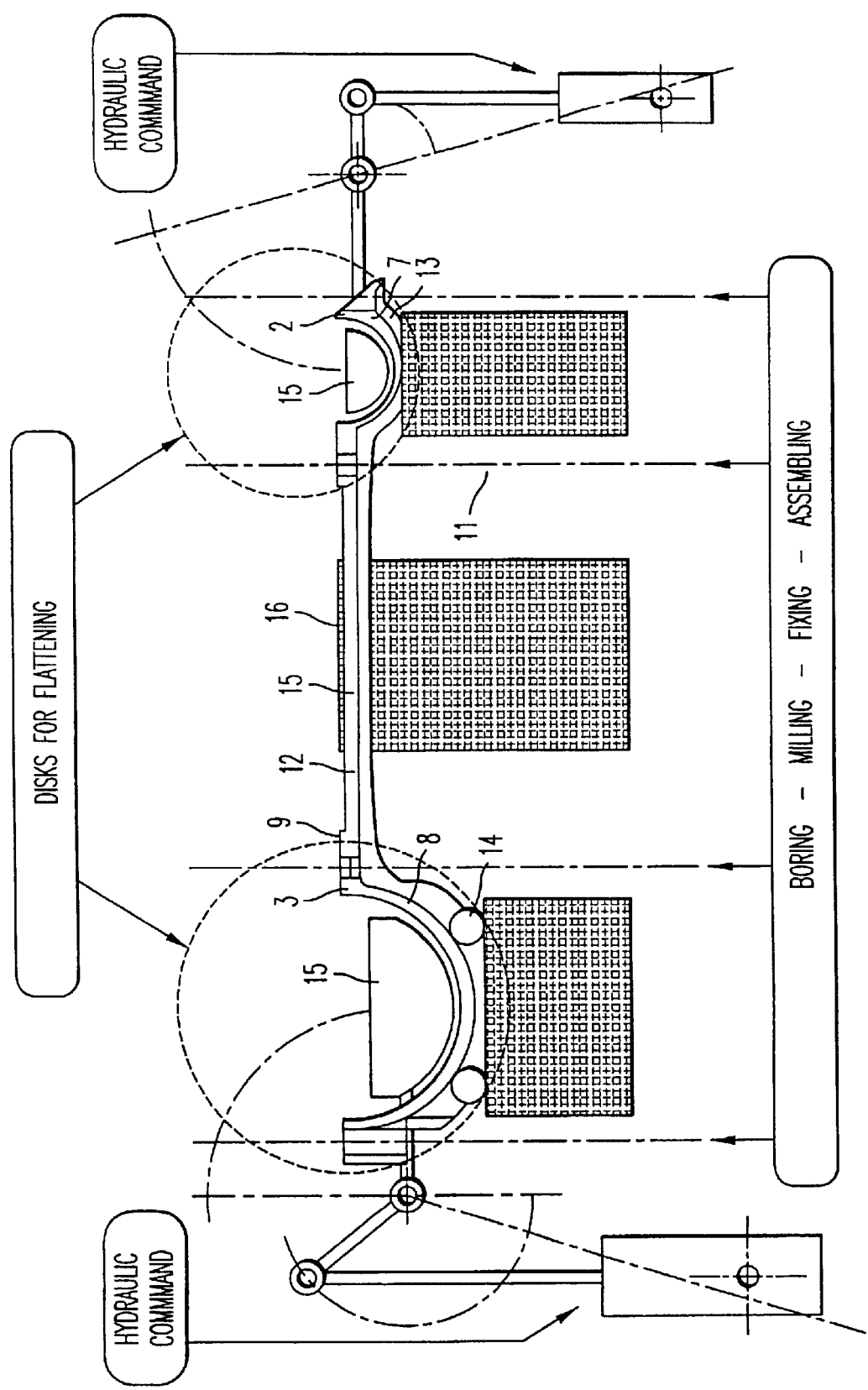
FIG. 2 is a side elevational view of a half connecting rod fixed on the plate.

The positioning of the as-forged rough half connecting rods on the plate 11 can be effected as shown in FIG. 2. Each as-forged half connecting rod 5 comprises outer ribs 12 throughout its length, and rests adjacent to the connecting rod small end 2 on a simple support 13 whose profile is inscribed in cavities, and adjacent to the connecting rod big end 3 on two cylindrical rods 14 also inscribed in the ribs of the connecting rod big end. This type of assembly permits, irrespective of the values of the radii of the forged skins in these regions, positioning the joint surface 9 in such manner that the cheek thicknesses are respected at the connecting rod big end and small end, and therefore minimizing the dispersion of the masses. Each as-forged half connecting rod 5 positioned in this way is clamped in these two bearings, for example by hydraulic shoes 15 and, in the region of the connecting rod body, by a hydraulic clamp 16. Each shoe 15 has a thickness less than the radius of the bore of the corresponding bearings so that, in the clamping position, the joint surface 9 is completely free for the path of the milling cutter.

Figure 3:
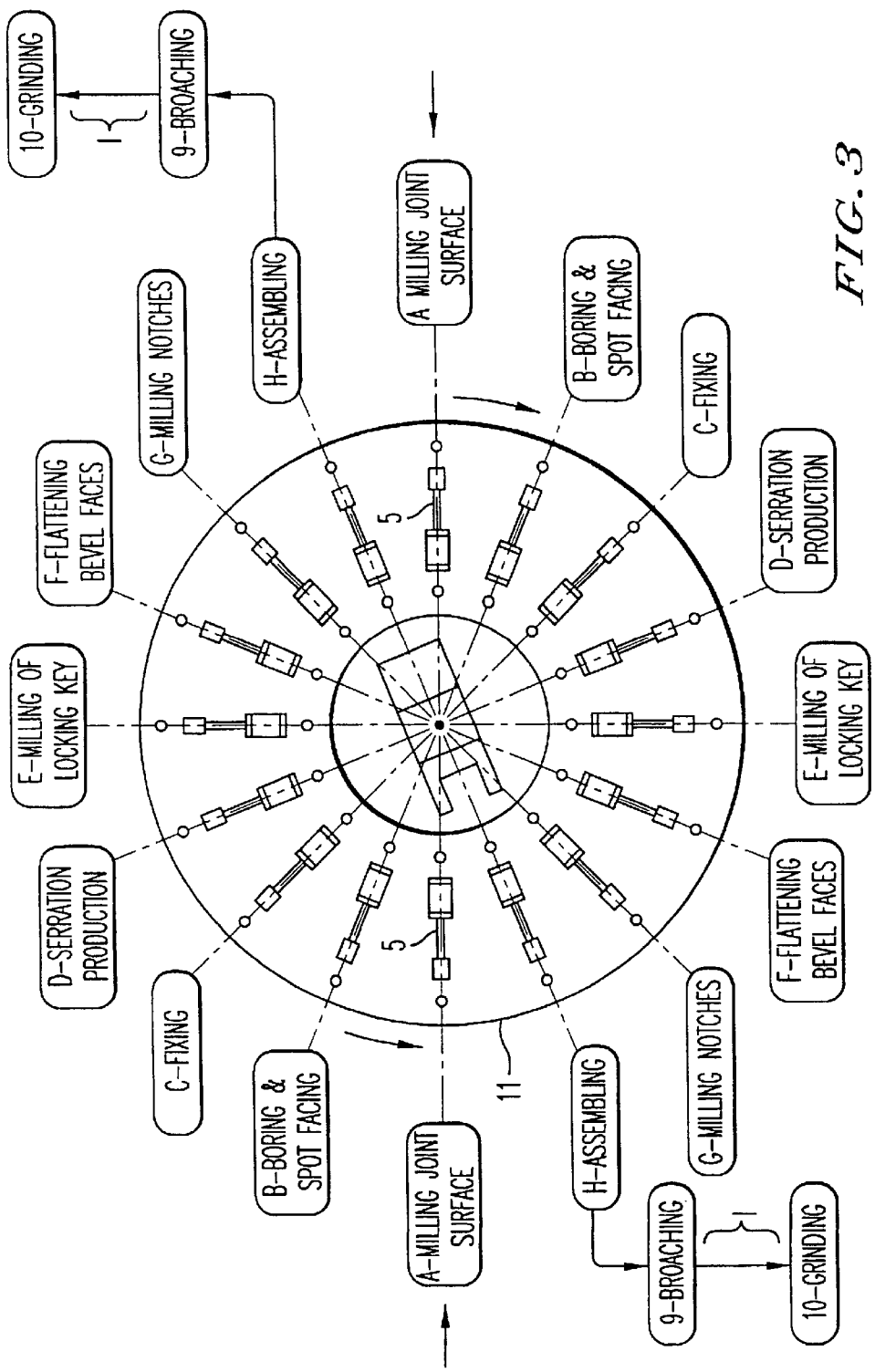
FIG. 3 is a plan view of the device according to the invention.
Figure 4:
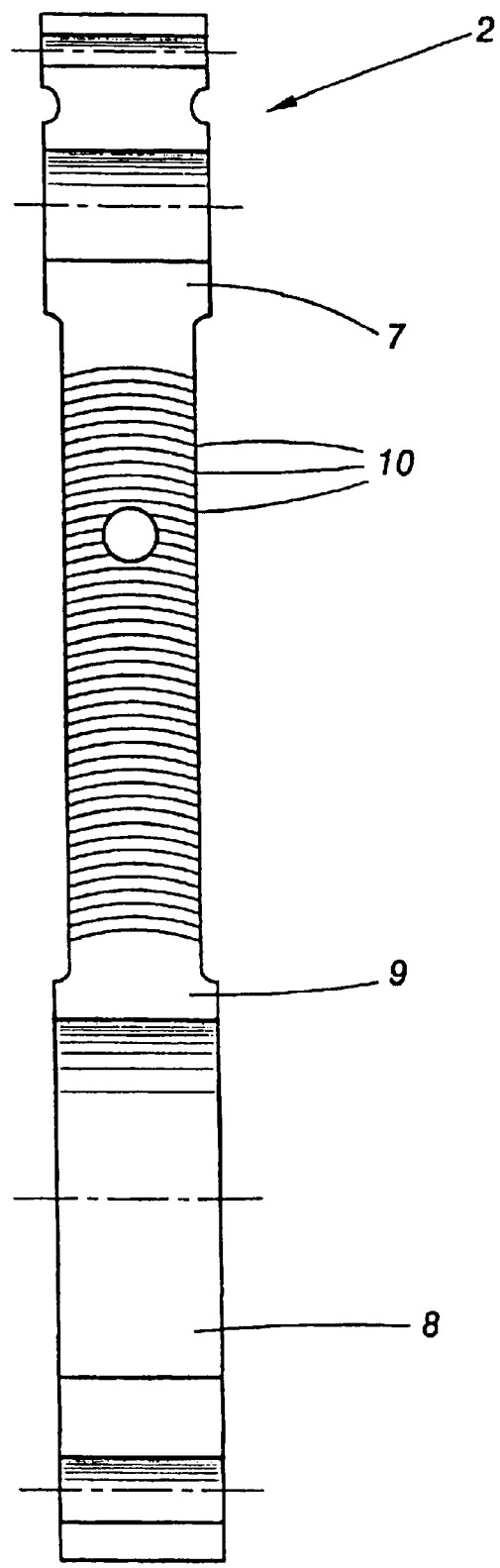
FIG. 4 is a view showing the curved serrations.

As shown in FIG. 3, in one embodiment, a circular plate 11 for the distribution of different machining operations comprises in succession the following stations:

a station A for milling the joint surface 9 with a surfacing milling cutter, a station B for boring and spotfacing, the tools being located below the plate so that the borings and the spotfacings can be effected in the same operation. The openings for assembling bolts and the cavities of for example a locking key body of the means for interconnecting the two half connecting rods are machined directly to the desired dimension, a fixture station C on which the half connecting rods are immobilized by hydraulic expansion pins located under the plate. This fixture operation has for purpose to improve on one hand the rigidity of the connection of the half connecting rods to the plate 11 and on the other hand access for the following operations, a serrating station D for producing the serrations 10 according to the invention.

the tools are combs having curved teeth, preferably concentric circular teeth, the pitch of the teeth being for example constant. The width of the combs and their profile, which may be if desired special, are defined by the toolmakers.

Two devices may be placed in position on the plate 11.

The series of combs corresponding to the facing half connecting rods are offset by half a pitch, the profile of the teeth being of course adapted. In this case, the half connecting rods in the assembled position have their half bearings in facing relation to within forging tolerances. It is then necessary to have two sets of tools.

The series of combs corresponding to the facing half connecting rods 5 are concentric relative to the plate 11. The serrations 10 are produced in an identical manner on the two facing half connecting rods. A single set of tools is necessary but, upon assembly, the facing half connecting rods are offset by half the pitch of the serrations, namely for example by 0.5 mm. This offset does not interfere with the assembly since the displacement of a half connecting rod relative to the other remains small. It will however be necessary to provide an extra nominal machining thickness.

A milling station E, for example for a cavity of a locking key head in accordance with the solution adopted for the locking of the two half connecting rods.

A station F for machine surfacing faces and beveling the connecting rod big end and small end bearings.

In order to carry out these operations, the hydraulic shoes 15 are disengaged, the half connecting rods being maintained by the hydraulic expansion pins. Two parallel discs for calibrating the width at the connecting rod big end and two discs for calibrating the connecting rod small end may carry out this operation by a vertical plunging motion. The discs may include a cutting or abrasive shoulder which, when combined with the path of the center, permits machining the bevels on each side of the half bearings.

A milling station G for milling bush notches effected by a sawing disc or milling cutter.

An assembling station H for assembling the two facing half connecting rods 5, their serrations fitting into one another when their joint surfaces are in contact. In order to carry out this assembling operation, for example, a hydraulic tongs disposed in the central disk of the plate takes hold of one of the half connecting rods between the surfaced faces. After the fixture of this half connecting rod has been withdrawn under the plate, the hydraulic tongs effects a turning over through 180° so as to bring the two facing half connecting rods in the assembled position. In this position, the fixture of the lower half connecting rod which has not been turned over through 180° is withdrawn and the pin bores are used for the passage of the bolts for immobilizing the two half connecting rods together.

After the two hydraulic clamps have been withdrawn, the two matched and assembled half connecting rods forming the connecting rod are fed to a station for machining the bearings.

A station I for machining the bearings.

The bearings may be machined by broaching and then lapping, or, depending on the forging dimensions, directly by grinding.

Some of the stations which do not directly depend on the foregoing order may be displaced without adversely affecting the method.

What is claimed is:

1. Method for producing a connecting rod having a big end and a small end from as-forged rough half connecting rods having rough joint surfaces, in which the rough half connecting rods are placed along the periphery of a circular plate for the distribution of the different successive machining operations, said method comprising:

placing and clamping the as-forged rough half connecting rods in pairs in a diametrally opposed manner, the joint surfaces remaining free, carrying out on each of the two half connecting rods a boring, spotfacing and machine surfacing operation on the joint surface, said boring and spotfacing being intended for the mechanical assembly of said half connecting rods and a fixture of the half connecting rods on the plate, producing on the machined joint surface of the two half connecting rods serrations which ensure by their shape, after the assembly of the two facing half connecting rods a locking against slip in a joint plane joining said half connecting rods, in particular along a longitudinal axis of said connecting rod and along an axis of the crankpin and/or piston pin simultaneously, surfacing parallel faces defining the thickness of the connecting rod big end or small end, assembling the two half connecting rods by a rotation through 180° of a half connecting rod relative to an axis of rotation parallel to the plane of the circular plate, the serrations fitting into one another in a complementary manner, and machining bores forming bearings of the connecting rod big end or small end.

* * * * *